United States Patent [19]
Atkins et al.

[11] Patent Number: 5,734,902
[45] Date of Patent: Mar. 31, 1998

[54] COMMUNICATION SYSTEM FOR MAINTAINING DATA CONSISTENCY AMONG REPLICATED SHARED OBJECTS

[75] Inventors: Steve John Atkins, Long Eaton; Jeffrey Norman Froggatt, Stapleford; Leonard William Parker, Long Eaton, all of England

[73] Assignee: GPT Limited, United Kingdom

[21] Appl. No.: 10,412

[22] Filed: Jan. 28, 1993

[30] Foreign Application Priority Data

Jan. 31, 1992 [GB] United Kingdom ............... 9202072

[51] Int. Cl.⁶ .......................... G06F 9/46; G06F 15/163
[52] U.S. Cl. ............................. 395/683; 395/200.43
[58] Field of Search .................... 395/200, 425, 395/600, 683, 200.43, 200.49, 200.45, 200.78, 608, 614

[56] References Cited

U.S. PATENT DOCUMENTS

| | | | |
|---|---|---|---|
| 4,007,450 | 2/1977 | Haibt et al. | 340/172.5 |
| 4,432,057 | 2/1984 | Daniell et al. | 364/300 |
| 4,558,413 | 12/1985 | Schmidt et al. | 395/700 |
| 4,562,539 | 12/1985 | Vince | 395/200 |
| 4,642,760 | 2/1987 | Yanai et al. | 364/200 |
| 4,714,992 | 12/1987 | Gladney et al. | 364/200 |
| 4,714,995 | 12/1987 | Materna et al. | 364/200 |
| 4,714,996 | 12/1987 | Gladney et al. | 364/300 |
| 4,897,781 | 1/1990 | Chang et al. | 364/200 |
| 5,027,427 | 6/1991 | Shimizu | 455/67 |
| 5,136,707 | 8/1992 | Block et al. | 395/600 |
| 5,155,847 | 10/1992 | Kirouac et al. | 395/600 |
| 5,255,387 | 10/1993 | Arnold et al. | 395/600 |
| 5,363,498 | 11/1994 | Sakurata et al. | 395/425 |
| 5,367,673 | 11/1994 | Goldsmith et al. | 395/600 |
| 5,408,619 | 4/1995 | Oran | 395/325 |

FOREIGN PATENT DOCUMENTS

| | | |
|---|---|---|
| 0 213 276 A2 | 5/1986 | European Pat. Off. . |
| 0 374 512 A2 | 6/1990 | European Pat. Off. . |
| 0 497 022 A1 | 8/1992 | European Pat. Off. . |

OTHER PUBLICATIONS

The Treatment of Persistent Objects in Arjuna, G. N. Dixon, G. D. Parrington, S. K. Shrivastava and S. M. Wheather, 8199 The Computer Journal, vol. 32, (1989) Aug., No. 4, Cambridge, GB, pp. 323–328.

*Use of Relocatable Objects to Facilitate Storage of Large Data Structures on Parallel Processors with Distribiuted Memory*, Anonymous Research Disclosure, 2244 (1990) Jan., No. 309, New York, US, No. 30975.

*Implementing Fault–Tolerant Replicated Objects Using Psync,* Shivakant Mishra, Larry L. Peterson, and Richard D. Schlichting, Department of Computer Science, University of Arizona, Tucson, AZ, 85721, pp. 42–52.

"Data Integrity by Central Data Management", IBM TDB vol. 32, No. 12, pp. 71–72, May 1990.

"Host Notification of Subsystem or Device Status Change", IBM TDB, vol. 32, No. 11, p. 159, Apr. 1990.

*Primary Examiner*—Dinh C. Dung
*Attorney, Agent, or Firm*—Kirschstein, et al.

[57] ABSTRACT

A shared object is created which is copied to all system nodes requiring access to the object and a used-by table is created identifying the nodes holding a copy of the object. When the object is updated by operations at one of the nodes then the copies identified by the used-by table are also updated.

6 Claims, No Drawings

COMMUNICATION SYSTEM FOR MAINTAINING DATA CONSISTENCY AMONG REPLICATED SHARED OBJECTS

BACKGROUND OF THE INVENTION

This invention relates to a communications system

In recent years a new programing technique has been increasingly employed for developing software programs. This technique is referred to as Object Orientation and is applicable to all stages of the software development lifecycle from Analysis to Coding. The main principle employed is to construct objects which are an encapsulation of data and the functions that operate on that data such that the following holds true:

a. Objects only communicate with each other by passing messages.

b. The user of an object need not know anything about the internal implementation of the object, only the services that it can provide (through the receipt of a valid message).

c. The objects chosen should bear some relationship to the problem in hand. In general, Object Oriented software systems contain Objects which are abstractions of entities within the system that the software is intended to monitor or control.

This simple description does not fully characterise Object Orientation as a technique, but acts as a basis to understand the invention. Whilst objects have been defined in software terms, objects may also be thought of as amalgams of software and hardware, e.g. passing a message to an object may result in behaviour which effects the state of hardware which is being controlled—the 'software' part of the object effectively being no more than an interfacing mechanism to the 'hardware' part of the object.

As objects in a telecommunications system only communicate by the means of passing messages this offers a great deal of architectural flexibility in constructing Object Oriented systems. This gives rise to the problem that there is little difference between passing a message between objects that exist in a single process that exist in separate processes on the same machine or between objects on different machines. It is just the mechanism for passing the message that differs in each case. The implication of this is that there is no longer any rigid relationship between objects and processes and machines.

The term 'process' is used universally in software circles to mean a portion of software that is running concurrently with other processes on the same machine, i.e. the execution of instructions within a process is not dependent upon the initiation or completion of instructions within another process. This concurrency is usually achieved by using a multitasking operation system to share system processing time between the processes. If such a sharing mechanism is not provided there can only be one process per machine.

It is common in Object Oriented Systems for a single object to have many users. If the users of an object are objects within the same process then there can be no concurrency involved and messages will arrive sequentially. If the object is to be used by objects in different processes the question of how to handle concurrent accesses must be addressed.

Although processes alone will be referred to in the following, exactly the same may be applied for objects distributed on more than one machine.

The problem has been previously addressed by using the standard client-server models. In this approach the object to be used by a number of concurrent objects is placed in a process of its own—this is known as a server process. The objects in other processes (now known as client processes) can then pass messages to the object in the server process in order to utilise its behaviour. The concurrency of the requests being handled by some form of queuing mechanism at the interface to the server process, provided as part of the inter-process message passing mechanism.

Whilst this mechanism works, it has a number of drawbacks:

a. The action of the server process is to deal with concurrency by serialising it, i.e. the messages are just queued and dealt with one after the other. The concurrency which was attempted, effectively has been thrown away. How acceptable this is will depend upon the actual system under consideration, but on systems which have achieved concurrency by the use of multiple machines such a scheme can lead to enforced idle time whilst clients are awaiting server responses and results in non-optimal performance.

b. Message passing between objects within the same process is always much faster than message passing between objects in differing processes. The client-server approach enforces the use of the slower mechanism. If object communications could be restricted within a process as far as is possible, then worthwhile improvements in performance would be gained.

c. Typically Object Oriented designs result in a large number of objects which will need to be used by many different processes. The client-server approach typically results in a compromise between the two extremes of putting all such objects in a single server process and placing each object in a process of its own. The use of a single server process results in a message bottleneck whereby system operation is slowed down to the speed at which the server queue is serviced, and the number of objects is usually too large to practically allocate a process to each one due to system resource limitations. In large systems a satisfactory compromise commensurate with required system performance cannot be met.

SUMMARY OF THE INVENTION

In order to address the above issues (a–c) above the Shared Object model of the invention has been produced.

If objects in differing processes wish to utilise another object between them then this object may be thought of as a shared object. Rather than creating a server process an alternative is to create a copy of this shared object in each of the processes that wish to access it. All messages passing to the shared object appears to be within the same process, in addition there is no serialization of the messages on a queue, i.e. concurrency is preserved. This sounds ideal except that in order for this shared object to be a shared object each copy within each process must be exactly the same.

An object is characterised by both its internal data and its methods (the functions which act upon its internal data in response to arriving messages). An object's internal data is usually dynamic and varies with time. The object's methods are more static, usually being defined at system build time (or earlier) and do not vary during the system's lifetime. Therefore, when copies are made of a shared object it is only the internal data which must be kept consistent. If the methods used within a process only result in read operations on the shared object's internal data then there is no problem.

However, if the methods activated result in internal data change, i.e. write operations, then such changes must be made to every copy of the shared object to maintain consistency.

This can only be achieved by inter-process messaging. A data structure must be created, and maintained, which details each process which is currently utilising a shared object. When the internal data of the shared object is modified in one of the processes this table is utilised to recreate or update the copies held by the other processes.

This shared object approach addresses the problem of concurrency as this is maintained via the multiple copies of the shared object. Inter-process messaging is still employed, but only when a shared object method resulting in internal data change is utilised, faster inter-process messaging being used for all other methods. The problem of allocating objects to server processes and the performance problems associated with this are eliminated. This is not to say that the client-server model should not be used—there are still circumstances where it would be sensible to use this arrangement over a Shared Object approach. In addition the shared object approach also has some potential drawbacks, namely:

a. If an object is being shared by many processes a large data table must be maintained. (However, in the client-server approach such a situation would translate into a message bottleneck).

b. In order to ensure that updates to a shared object's internal state are made consistently, object locks must be utilised, i.e. to ensure that the data is not updated from two different processes at the same time.

According to one aspect of the present invention there is provided a method of operating a communications system in which when an object including data is located at a first system node and the object is required for use at a second system node, a copy of the object is provided to the second node and a record is created in a table identifying the object and the associated second node and where the object also is required at a further system node or further system nodes, the further node or nodes also are identified in the table, whereby, when data included within the object is updated by operations at one of the nodes, the copies held at all other nodes are updated in response to the records held within the table.

According to a further aspect of the invention there is provided means for operating a communications system, the system comprising a plurality of system nodes and objects including data held at at least some of the nodes, comprising storage means for recording when a copy of an object held at one of the nodes is provided for at least a further one of the plurality of nodes and the node or nodes for which the copy is provided, and means whereby when a copy of the object is updated by operations at one of the nodes, the copies held at all other nodes being updated in response to the record in the storage means.

DETAILED DESCRIPTION OF THE PREFERRED EMBODIMENT

The present invention will now be described, by way of example.

The standard implementation of a client-server approach is to employ small pieces of code (sometimes termed message stubs) in the client and server processes which interface with some form of inter-process communications (IPC). The purpose of the code in the client process is purely to relay any requests on the object in the server process as messages to the server process using the IPC mechanism.

The IPC mechanism will queue messages at the server process, with the small amount of code in the server process reading this queue and directing the requests to the object to service them. The whole process can be thought of as a pipe which takes in requests at one end from the client process (es) and delivers them at the other end of the pipe to the appropriate object in the server process. All activity required to service the requests (rather than merely transport it) is handled in the server process.

The implementation of the shared object approach replaces the client-server 'pipe' with a mechanism which deals with requests locally within the process using the shared object. When such requests modify the internal data of the shared object, only then will inter-process communications be utilised to ensure other copies of the object are brought into alignment with the changes.

Objects that are to be shared within a system must be identified as such at compile time. This is achieved by defining a shared object class from which objects wishing to exhibit this characterstic may inherit. Whenever a shared object is created, a copy of that object is created within the requesting process. If this is the first time that object is created then two additional items are created; a copy of the object's data is created in share memory along with a used-by table into which an identifier for the requesting process is written. Subsequent creations of this shared object by other processes will result in a copy of the object being created within the requesting process whose internal data will be an exact copy of the data stored in shared memory, and the used-by table is updated with the requesting processes' ID.

The shared memory can be thought of as a global data area accessible from any process.

Whenever a request is made of a shared object, then that request is serviced locally by the process. If the request results in the shared object's internal data being modified, then the shared memory copy of the shared object's data is updated to reflect the change(s). In addition to this it will be necessary to send a signal to every other process using the modified shared object indicating a change has occurred such that they can realign their local copies of the shared object with the modified data stored in shared memory. This signalling process has been given the term Broadcast on Update (or BOU) and is achieved by utilising the used-by table to send a signal to all processes registered as users of the shared object. Each process which contains shared objects must contain a BOU signal handler which will ensure that the BOU signal results in the necessary updates.

It is of course possible that a process will at some point no longer require to share an object. When this occurs, the shared object will be removed from the process and the used-by table will be modified to delete the requesting processes' identification.

We claim:

1. A method of operating an object-oriented system including means for storing an object having alterable data and a function adapted to operate on the alterable data, and means for providing a copy of the object to at least one process remote from said storing means, said method comprising the steps of:
   a) altering the alterable data of the object;
   b) communicating the existence of the altered data to each copy of the object; and
   c) providing a copy of the object with a copy of the altered data in response to a request from the remote process for the altered data.

2. The method as claimed in claim 1, and further comprising the steps of:

altering the alterable data of a copy of the object; and communicating the altered data to the object, said step of altering the alterable data being performed by altering the alterable data of the object to correspond with the altered data held by said copy of the object.

3. The method as claimed in claim 1, wherein said request from the copy of the object for the altered data is made only when the copy of the object needs to use the alterable data.

4. An object-oriented system, comprising:

a) means for storing an object having alterable data and a function adapted to operate on the alterable data;

b) at least one means for storing a copy of the object in a process remote from said means for storing the object;

c) means for altering the alterable data of the object;

d) means for informing each said at least one means for storing the copy of the object in which a copy of the object is stored that the alterable data of the object has been altered; and e) means for providing a copy of the object with a copy of the altered data of the object in response to a request from the means for storing a copy of the object for a copy of the altered data.

5. The system as claimed in claim 4, and further comprising means for altering the alterable data of a copy of the object; means for providing the object with a copy of the altered data of the copy of the object; and wherein said means for altering the alterable data of the object alters the alterable data of the object to correspond with the altered data of the copy of the object.

6. The system as claimed in claim 4, wherein said providing means is operative for requesting the copy of the altered data only when the copy of the object needs to use the alterable data.

* * * * *